United States Patent [19]
Bussen et al.

[11] 3,908,473

[45] Sept. 30, 1975

[54] LINEAR MOTION SNAP-ACTION MECHANISM

[75] Inventors: Michael Robert Bussen, Arnold; Gary Lee Schurter, St. Louis, both of Mo.

[73] Assignee: International Telephone and Telegraph Corporation, New York, N.Y.

[22] Filed: Jan. 9, 1974

[21] Appl. No.: 432,065

[52] U.S. Cl. .................... 74/100 R; 200/77; 200/78
[51] Int. Cl.² ................. F16H 21/44; F16H 21/54; F16H 25/18
[58] Field of Search ............ 200/70, 76, 74, 78, 77, 200/153 SC; 74/97, 100

[56] References Cited
UNITED STATES PATENTS

| | | | |
|---|---|---|---|
| 1,380,595 | 6/1921 | Ritz, Jr. ................................. | 200/78 |
| 1,600,127 | 9/1926 | Nero ..................................... | 200/78 |
| 1,837,544 | 12/1931 | Haller ................................... | 200/78 |

Primary Examiner—David Smith, Jr.
Attorney, Agent, or Firm—James B. Raden; William J. Michals

[57] ABSTRACT

A linear motion snap-action mechanism includes a reference frame having a pair of carrier slots. First and second spring-loaded detent pins are respectively disposed and movably mounted in the carrier slots. An input arm is slidably mounted about the frame and includes two spaced-apart ramp members, wherein each ramp member engages and moves one of the pins when the input arm is in a corresponding position. An output arm is also slidably mounted about the frame and includes two spaced-apart detent slots, each slot receiving one of the detent pins when the output arm is in a corresponding position. A storage spring is constrained between the input and output arms and is compressed by longitudinally translating the input arm away from the output arm until one of the ramp members moves one of the spring-loaded pins out from a detent slot of the output arm at which time the spring snaps the output arm toward the input arm.

6 Claims, 13 Drawing Figures

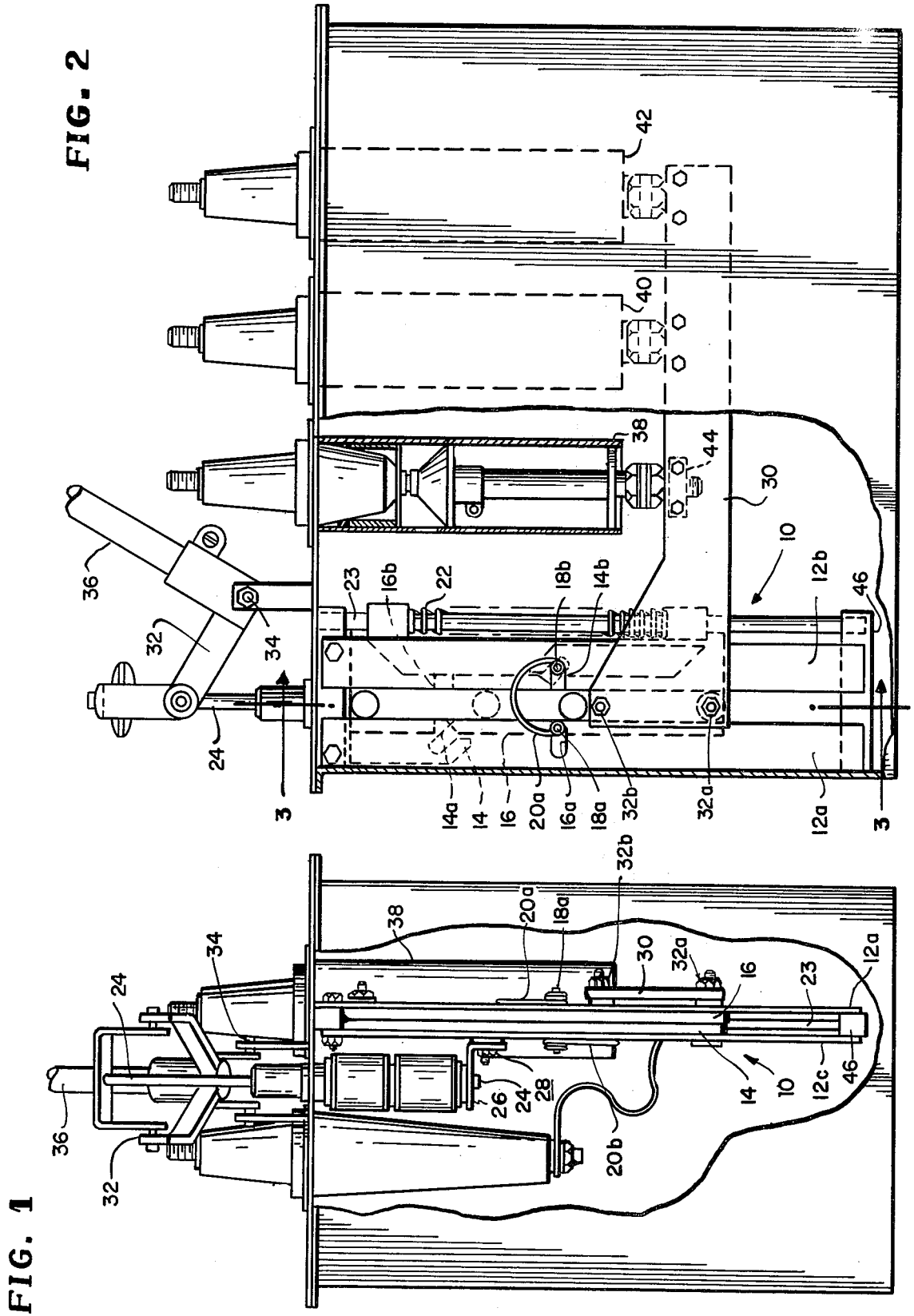

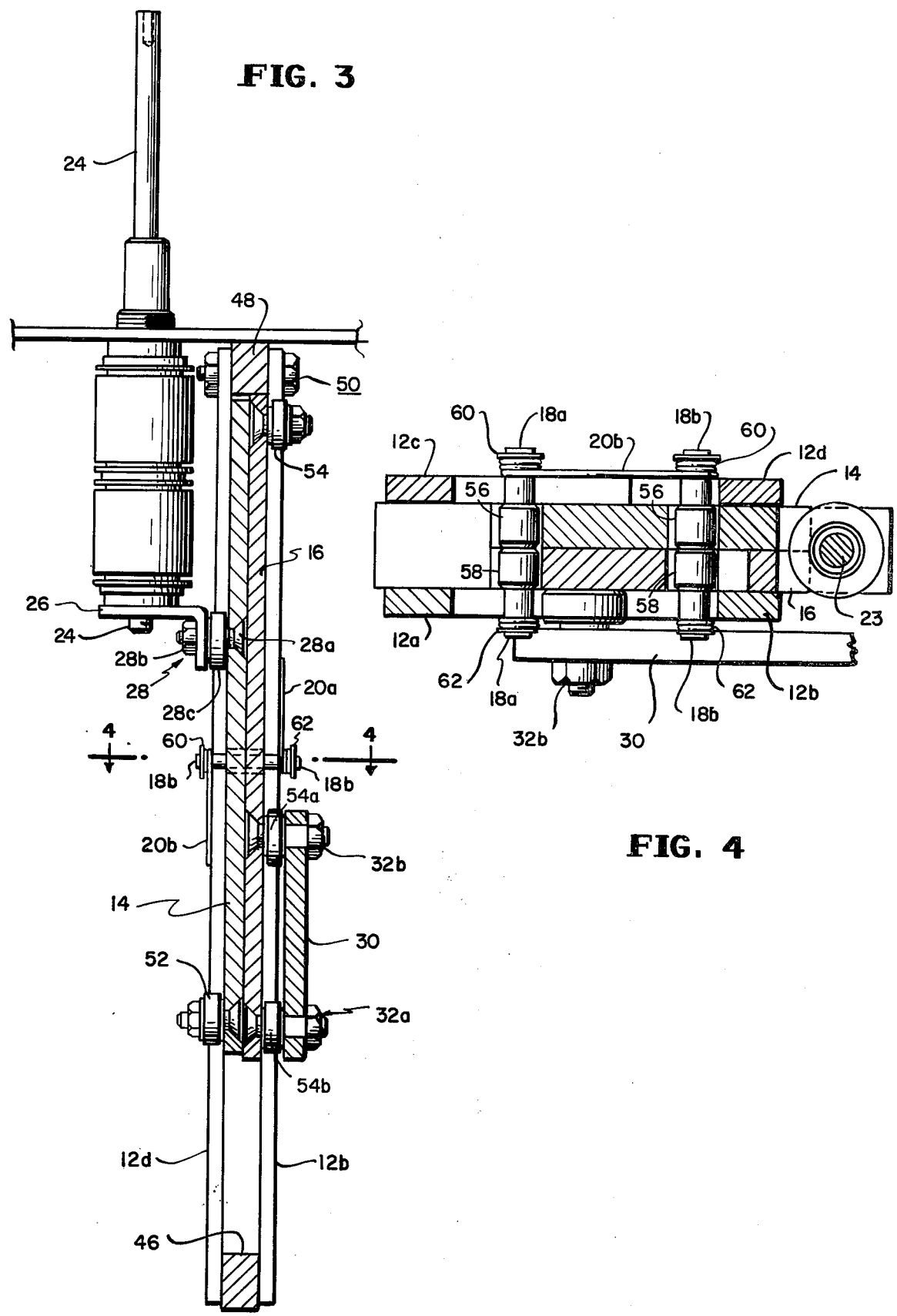

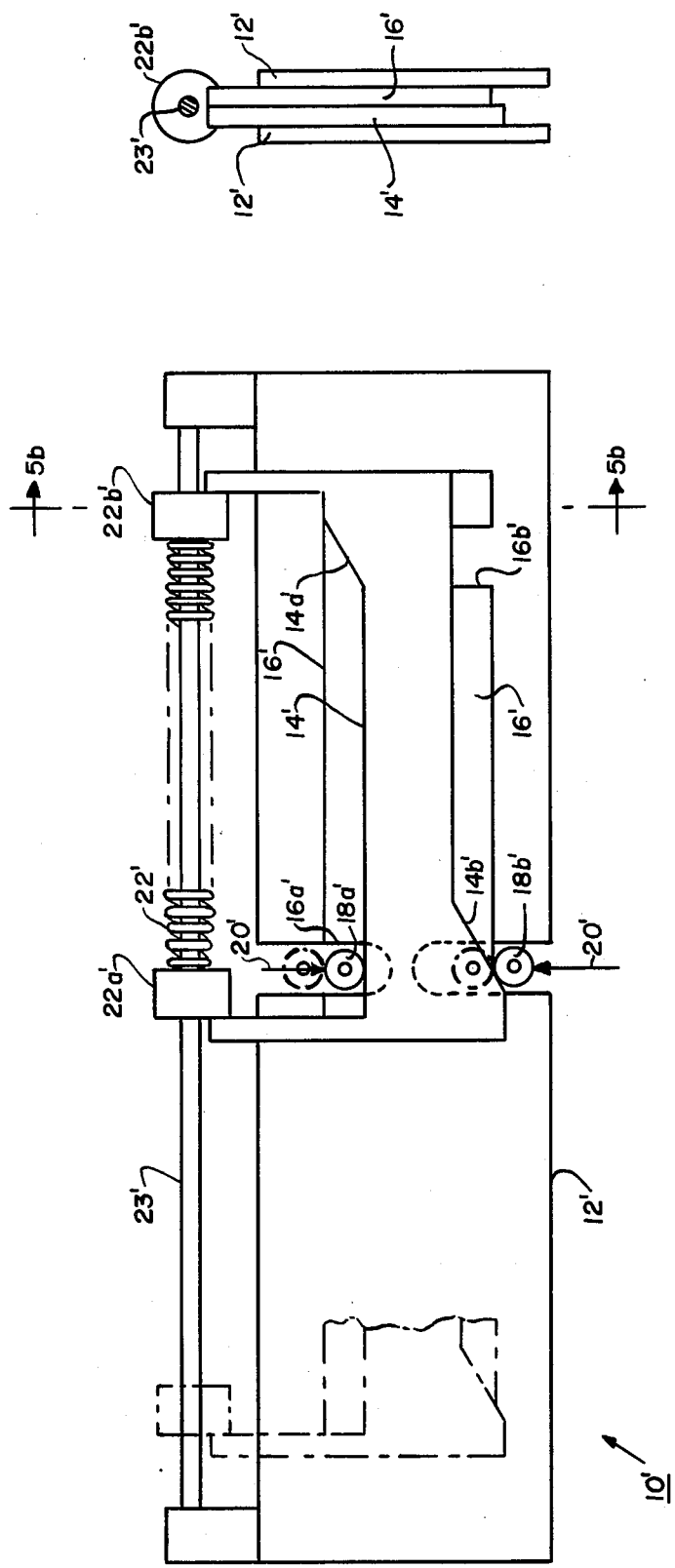

LINEAR MOTION SNAP-ACTION MECHANISM

BACKGROUND OF THE INVENTION

This invention relates to a linear motion snap-action mechanism and, more particularly, to a snap-action mechanism wherein the input, output and storage spring motion of the mechanism is linear.

In the prior art, a toggle mechanism is used in applications such as rock crushers, presses, riveting machines, clutches, vise-grip pliers, etc., where a large force is required to act through a short distance. In these devices there is a rapid rise in the ratio of the useful force output to the input force. When a toggle mechanism is used to apply a steady force, as in the engagement of a clutch, it is often made self-locking in the engaged position by permitting the various linkages to go slightly above or below dead center, where the mechanism is held against a stop by the output force. This toggle principle is effectively used in switches, circuit breakers and other mechanisms where a snap action is required. The principal of operation of these prior art mechanisms is based on the fact that an input and an output arm act on arcs of different radius. The difference between the radii cause a relative change in distance between the respective ends of the arms, as the input arm is translated through its arc, which is utilized to store energy in a spring. The stored energy is released when the input crosses over center, thereby snapping the output arm into an alternate position.

Since these prior art devices utilize input and output arms acting on different radii, motion is not directly linear and extra hardware is usually required for true linear motion. Further, the associated spring energy is not used efficiently as the mechanical advantage of the system increases only as the angle between the input and output arms increases. Another disadvantage of these prior art snap-action mechanisms is that in the end positions, the output arm is maintained in a stable or fixed position solely by the spring force. Still another disadvantage is that a dead spot exists at the midway point of the mechanism operation wherein an undesired reversal of the output arm can result from an inadvertent reversal of the input arm.

These and other disadvantages are overcome by the present invention wherein the motion associated with the snap action mechanism is linear and the spring energy storage means also operates in a purely linear fashion. The spring energy is applied directly to the load whereas, however, in prior art toggle mechanisms, the energy of the spring is applied as only the normal component of the spring force. Further, in the present invention the output arm is locked in place in its end position with detent members. Accordingly, any force applied to the output arm is transferred through the detent members to an associated housing. Hence, the spring is not relied upon to hold the output arm in a fixed position. In one embodiment, the present invention incorporates locking fingers which prevent the input arm from moving while the output arm is in motion, thereby avoiding the undesired reversal problem of the prior art.

SUMMARY OF THE INVENTION

Briefly, the present invention provides a linear motion snap-action mechanism including a reference frame having a given longitudinal dimension, and having at least one pair of carrier slots provided therein with each slot being provided along a generally lateral dimension. First and second detent members are respectively disposed and moveably mounted in the carrier slots. A spring bias means respectively urges the first and second detent members toward one end of the corresponding carrier slot. An input arm is slidably mounted about the frame for translation in the given longitudinal dimension and includes first and second cam members spaced apart from one another along the longitudinal dimension. Each cam member is adapted to engage and move one of the first and second detent members away from the end of the corresponding carrier slot as the input arm is translated into a corresponding position. An output arm is slidably mounted about the frame for translation in the given longitudinal dimension and includes first and second detent slots spaced from one another along the longitudinal dimension. The first detent slot receives the first detent member when the output arm is at a first position and the first detent member is urged toward the end of the corresponding carrier slot, and the second detent slot receives the second detent member when the output arm is at a second position and the second detent member is urged toward the end of the other carrier slot. A storage spring is disposed between the input and output arms and is compressed when the input arm is translated away from the output arm. The output arm is translated back toward the input arm by the energy stored in the spring when either one of the cam members engages and moves one of the first or second detent members out from the corresponding detent slot.

BRIEF DESCRIPTION OF THE DRAWING

The advantages of this invention will become more readily appreciated as the same becomes better understood by reference to the following detailed description when taken in conjunction with the accompanying drawing wherein:

FIGS. 1 and 2 respectively show end and side views of
- a snap-action mechanism, in accordance with the present invention in a form adapted for use in a power distribution switch application;

FIG. 3 is a more detailed end view of the snap-action mechanism depicted in FIG. 1, taken along the line 3—3 of FIG. 2;

FIG. 4 represents a cross-sectional view taken along the line 4—4 of FIG. 3;

FIGS. 5 and 5b provide simplified views which are useful
- in explaining the principles of operation of the snap-action mechanism in accordance with the present invention;

DETAILED DESCRIPTION

Figure 6:
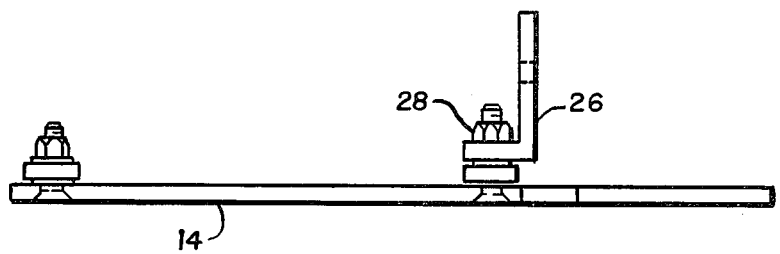
FIGS. 6 and 7 respectively show edge and top views of the
- input arm of the snap-action mechanism.

Referring now to FIGS. 1 and 2, there are shown end and side views of a snap-action mechanism 10 constructed in accordance with the present invention. Mechanism 10 of FIGS. 1 and 2 illustrates a preferred embodiment of the present invention suitable for use in a gas-insulated, underground power distribution switch. The function and structure of the gas insulated switch itself is described in greater detail in the copending application of Robert Strain et al, Ser. No. 432,064 filed even date herewith and assigned to the same assignee as the present invention.

Switch 10 of FIGS. 1 and 2 includes a reference frame comprising four frame members 12a – 12d. The frame 12a – 12d carries an input arm 14 and an output arm 16, both of which are slidably mounted therein. Input arm 14 includes first and second cam or ramp members, generally shown at 14a and 14b. Detent pins 18a and 18b are slidably mounted within first and second carrier slots provided on opposite sides of reference frame 12a–12d. Detent pins 18a and 18b are urged inwardly by means of springs 20a and 20b. Finally, a storage spring 22 is disposed between input arm 14 and output arm 16 and carried by a rod 23.

Still referring to FIGS. 1 and 2, it can be seen that input arm 14 is coupled to switch rod 24 by way of an angle bracket 26. Bracket 26 is securely fastened to the lower end of rod 24 as by welding or by conventional fastener means. Bracket 26 is coupled to input arm 14 by way of suitable fastening means generally shown at 28. Fastening means 28 in FIG. 1 includes a nut, bolt, spacer and roller bearing disposed to slide between frame members 12c and 12d.

The output arm 16 of mechanism 10 is coupled to crossbar 30 by way of fastening means 32a and 32b. Fastening means 32a and 32b may each comprise a nut, bolt, spacer and roller bearing adapted to slide between frame numbers 12a and 12b. Switching rod 24 is in turn pivotably connected to rocker arm 32 which is pivotably mounted about fixed support 34. The other end of rocker arm 32 is connected to lever arm 36. Crossbar 30 in FIGS. 1 and 2 is, in turn, coupled to "puffer" switches 38, 40 and 42 by way of suitable fastening means such as clamp 44.

In the operation of mechanism 10 of FIGS. 1 and 2, switch rod 24 is caused to move in a downward direction by rotating lever arm 36 about the pivot point of support 34. The movement of rod 24, in turn, causes input arm 14 to move downwardly until ramp member 14a engages detent pin 18a thereby causing pin 18a to move outwardly from a lower slot 16a of output arm 16 and within the slot provided in frame members 12a and 12c. At this point, output arm 16 is free to move in a downward direction and is propelled by the energy stored in spring 22 prior to the time when pin 18a was lifted by ramp member 14a. Output arm 16 and crossbar 30 move in a downward direction, upon being released, until output arm 16 is stopped at a first end bar 46, at which time detent pin 18b drops into the upper slot 16b of output arm 16. This movement of crossbar 30 disengages or interrupts the contact provided by puffer switches 38–42. The switching function provided by mechanism 10 is reversed when lever arm 36 is returned to the position shown in FIG. 2. That is, by rotating lever arm 36 back to its initial position, rod 24 is caused to move in upward direction until ramp 14b of input arm 14 engages detent pin 18b at which time output arm 16, and therefore, crossbar 30, rapidly return to the initial position depicted in FIGS. 1 and 2.

Referring now to FIG. 3, there is shown a cross-sectional view of mechanism 10 taken along the line 3—3 of FIG. 2. FIG. 3 shows more clearly the structure of fastening means 28, 32a and 32b. For example, means 28 includes a recessed bolt 28a, a nut 28b and roller bearing with center spacer 28c. Fastening means 32a and 32b comprise a similar configuration. It should not be appreciated that such fastening means permit input arm 14 and output arm 16 to be slidably carried by frame 12a–12d. FIG. 3 also shows the manner in which frame members 12a–12d are coupled together to provide a unitary frame. Frame members 12b and 12d are secured to end bar 46 such as by welding. A second end bar 48 is secured to the surface of the housing of switch and coupled to frame members 12b and 12d by suitable fastening means generally shown at 50. Finally, in FIG. 3, it can be seen that arms 14 and 16 are further constrained for linear motion within frame 12a–12d by way of roller bearings 52 and 28c, and 54, 54a and 54b, respectively.

FIG. 4 provides a cross-sectional view taken along the line 4–4 of FIG. 3. It can be seen that detent pins 18a and 18b each include a pair of axially mounted roller bearings such as 56 and 58. Roller bearings 56 and 58 facilitate the lifting and dropping of detent pins 18a and 18b in the respective slots of output arm 16 and the engagement of the ramp members of input arm 14. Bearings 56 and 58, and springs 20a and 20b are preferably secured to pins 18a and 18b by way of C washers 60 and 62.

Referring now to FIG. 5a, there is shown a simplified drawing which is useful in explaining the principle of operation of the snap-action mechanism in accordance with the present invention. The structure of mechanism 10' of FIG. 5a is similar to the structure of mechanism 10 of FIGS. 1 and 2, and accordingly, like elements bear the same reference numerals with the addition of a prime. Reference frame 12' includes first and second lateral slots in which detent pins 18a' and 18b' are carried. Spring means 20' urges pins 18a' and 18b' inwardly. A storage spring 22' is carried by rod 23'. Rod 23' is secured at its ends to frame 12'. An output arm 16' is slidably mounted about the frame 12' in a longitudinal direction thereof. An input arm 14' is also slidably mounted about the frame 12' and is similarly adapted for longitudinal movement along line A. Input arm 14' includes first and second ramp members 14a' and 14b'. Output arm 16' includes first and second slots as indicated at 16a' and 16b'. Rod 23' also carries first and second washers designated as 22a' and 22b'. Washers 22a' and 22b' and spring 22' are disposed between lateral projections of arms 14' and 16'. Accordingly, relative motion between input arm 14' and output arm 16' causes spring 22' to be compressed. FIG. 5b shows a cross-sectional view of mechanism 10' taken along the line 5—5 of FIG. 5a.

The operation of mechanism 10', in accordance with the present invention, is described as follows: Detent pin 18a' is disposed in the slot 16a' of output arm 16' and accordingly prohibits longitudinal movement of output arm 16'. Detent pin 18b', however, is disposed along an outer edge of output arm 16', and accordingly, it therefore does not constrain the movement of output arm 16'. Now, when input arm 14' is caused to move to the left, with respect to FIG. 5a, spring 22' is compressed between one lateral projection of each of arms 16' and 14'. The movement of input arm 14' continues to compress spring 22' until ramp member 14a' engages detent pin 18a' whereupon continued movement of input arm 14' lifts detent pin 18a' from slot 16a'. Once detent pin 18a' is sufficiently removed from slot 16a', output arm 16' is abruptly snapped toward the left direction by the stored energy of spring 22'. Output arm 16' is accordingly translated until slot 16b' is above detent pin 18b' at which time detent pin 18b' is urged and moved by spring means 20' upwardly into slot 16b'. The above described procedure is repeated to return arms 14' and 16' to their original position as depicted in FIG. 5a.

It should now be appreciated that in the operation of the mechanism, in accordance with the present invention, all motion is linear. That is, the motion of the input and output arms is purely linear, and, further, the energy storage provided by the compression of the spring is also linear. It can also be seen that the axis of the spring is always in line with the axis of the input and output arms. Accordingly, this means that the spring energy is applied directly to the load coupled to the output arm. In contrast, a prior art over-center toggle mechanism utilizes only one component of the spring vector force. Still further, in the end position where the output arm is locked in place with the detent pins, any force applied to the output arm is transferred through the pins and to the housing or frame. Accordingly, the spring is not required to hold or maintain the output arm in place as is the case with prior art mechanisms.

Referring again to FIG. 5a, it will be appreciated by those skilled in the art, that it is possible to reverse the operation of mechanism 10' before output arm 16' has fully translated to its alternate position. That is, during the time interval when the output arm 16' is being translated by the stored energy of the spring, it is theoretically possible to reverse the movement of the input arm. In certain applications of mechanism 10' of the present invention, this is undesirable. However, as described more fully with respect to FIGS. 6 and 7, and 8 and 9, a feature of the present invention provides locking fingers on input arm 14' which assures that the mechanism has completed its action before a reversal is possible.

Figure 7:
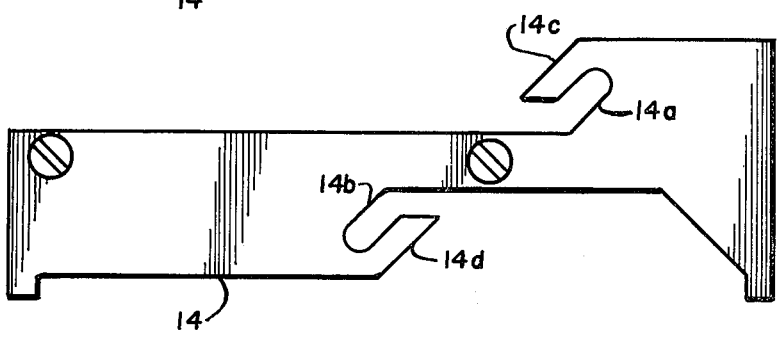
Figure 8:
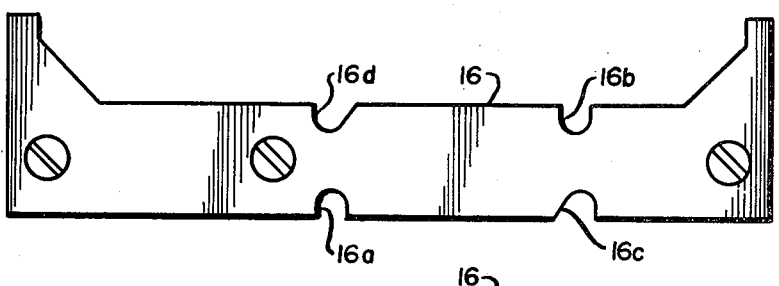
FIGS. 8 and 9 respectively show top and edge views of the
- output arm of the snap-action mechanism.
Figure 9:
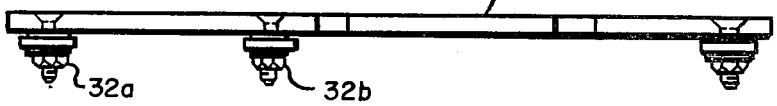

Referring now to FIGS. 6 and 7, there are shown side and plan views, respectively, of input arm 14 of the preferred embodiment of the present invention depicted by FIGS. 1–4. Similarly, FIGS. 8 and 9 respectively show plan and side views of output arm 16. In FIG. 7, the above-described locking fingers are shown at 14c and 14d. Locking fingers 14c and 14d cooperate with slots 16c and 16d of output arm 16 as described below.

When ramp 14a lifts detent pin 18a out from slot 16a, output arm 16 is free to move to its alternate position. During the motion of output arm 16, detent pin 18a is trapped between finger 14c and ramp 14a. Once output arm 16 receives detent pin 18b in slot 16b, the previously trapped detent pin, i.e., pin 18a, will be free to drop into slot 16c. Hence, it should now be appreciated that the action of mechanism 10 must be fully completed before a reversal is possible.

Figure 10:
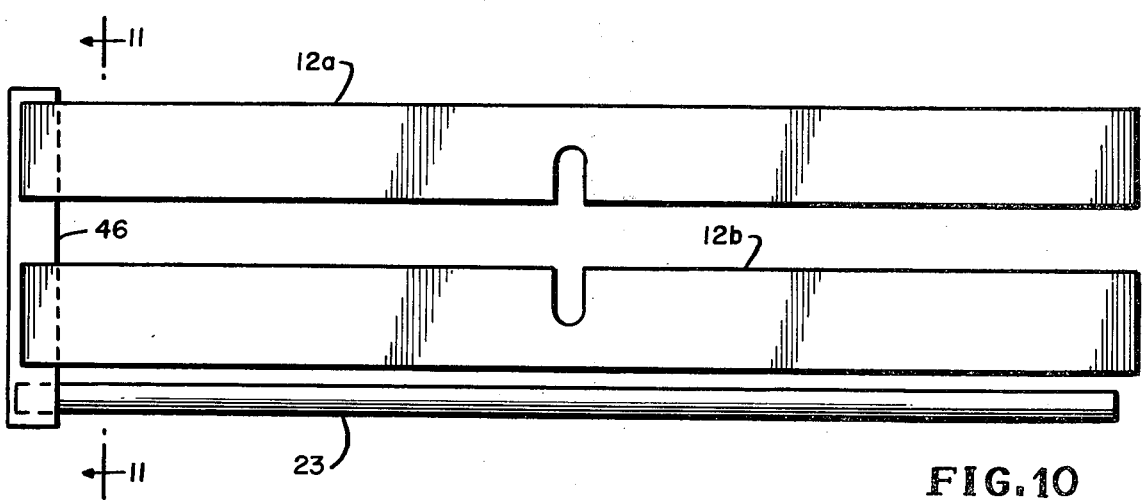
FIG. 10 illustrates a plan view of the reference frame of
- the snap-action mechanism.
Figure 11:
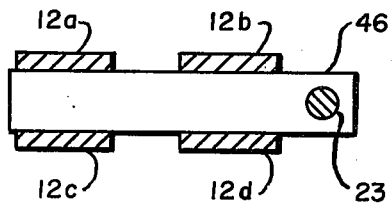
FIG. 11 shows a view of the reference frame of FIG. 10
- taken along the line 11—11.

Referring now to FIG. 10, there is shown a plan view of reference frame 12a–12d of FIGS. 1–4. FIG. 11 is a cross-sectional view taken along the line 11—11 of FIG. 10.

Figure 12:
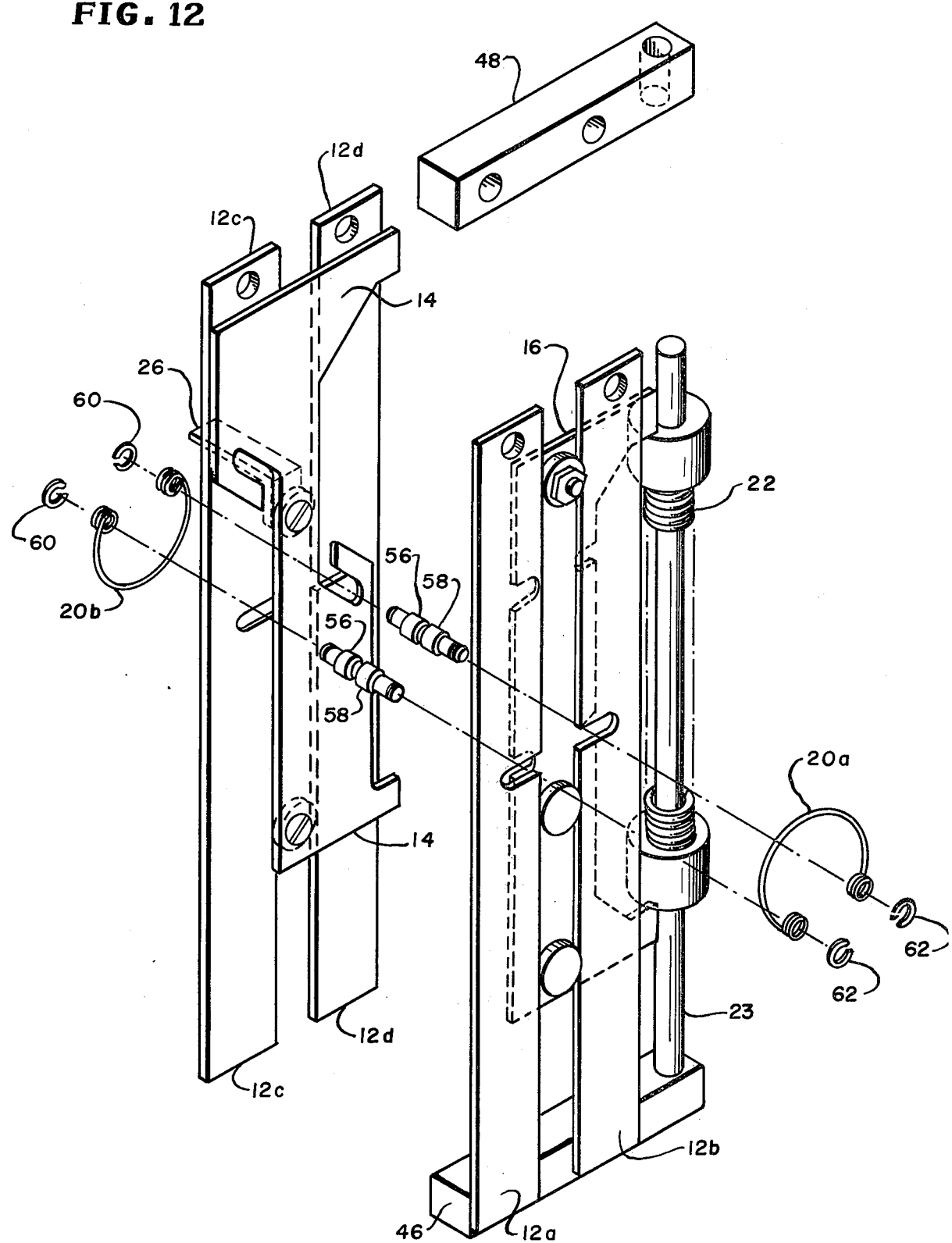
FIG. 12 is an exploded view of the embodiment of the present invention illustrated in FIGS. 1 – 4.

Referring now to FIG. 12, there is shown an exploded view of the embodiment of the present invention illustrated in FIGS. 1–4.

What has been taught, then, is a linear motion snap-action mechanism facilitating, notably, a toggle mechanism for use in switches, circuit breakers, and other configurations where a snap-action is required. The form of the invention illustrated and described herein is the preferred embodiment of these teachings in one form currently preferred for manufacture. It is shown as an illustration of the inventive concept, however, rather than by way of limitation. And it is pointed out that various modifications and alterations may be indulged in within the scope of the appended claims.

What is claimed is:

1. A linear motion snap-action mechanism comprising, in combination:

a reference frame having a given longitudinal dimension, and said frame having at least one pair of carrier slots therein, with each carrier slot being provided along a generally lateral dimension;

first and second detent members respectively disposed and moveably mounted in said carrier slots each of said detent members including roller bearing means and each detent member being independently movable relative to the other of said detent members;

spring bias means for urging said first and second detent members respectively toward one end of the corresponding carrier slot;

an input arm slidably mounted about said frame for translation in said given longitudinal dimension, said input arm having first and second cam members, said cam members being spaced from one another along said given longitudinal dimension, and each cam member being adapted to engage the roller bearing means of one of said detent members in rolling friction engagement therewith thereby to move one of said first and second detent members away from said one end of said corresponding carrier slot as said input arm is translated into a corresponding position;

an output arm slidably mounted about said frame for translation in said given longitudinal dimension, said output arm having first and second detent slots, said detent slots being spaced from one another along said given longitudinal dimension, said first detent slot receiving said first detent member when said output arm is at a first position and said first detent member is urged toward said one end of said corresponding carrier slot, and said second detent slot receiving said second detent member when said output arm is at a second position and said second detent member is urged toward said one end of the other carrier slot; and a storage spring disposed between said input and output arms wherein said storage spring is compressed when said input arm is translated away from said output arm and wherein said output arm is translated back toward said input arm by the energy stored in said storage spring when either one of said cam members engages and moves said one of said first and second detent members.

2. A linear motion snap-action mechanism comprising, in combination:

a reference frame having a given longitudinal dimension, and said frame having at least one pair of carrier slots therein, with each carrier slot being provided along a generally lateral dimension;

first and second detent members respectively disposed and moveably mounted in said carrier slots;

spring bias means for urging said first and second detent members respectively toward one end of the corresponding carrier slot;

an input arm slidably mounted about said frame for translation in said given longitudinal dimension, said input arm having first and second cam members, said cam members being spaced from one another along said given longitudinal dimension, and each cam member being adapted to engage and move one of said first and second detent members away from said one end of said corresponding carrier slot as said input arm is translated into a corresponding position;

an output arm slidably mounted about said frame for translation in said given longitudinal dimension, said output arm having first and second detent slots, said detent slots being spaced from one another along said given longitudinal dimension, said first detent slot receiving said first detent member when said output arm is at a first position and said first detent member is urged toward said one end of said corresponding carrier slot, and said second detent slot receiving said second detent member when said output arm is at a second position and said second detent member is urged toward said one end of the other carrier slot;

a storage spring disposed between said input and output arms wherein said storage spring is compressed when said input arm is translated away from said output arm and wherein said output arm is translated back toward said input arm by the energy stored in said storage spring when either one of said cam members engages and moves said one of said first and second detent members; and locking means cooperating with said first and second cam members for preventing relative movement between said input arm and said reference frame when said output arm is translating back toward said input arm.

3. The mechanism according to claim 2, wherein said locking means comprises first and second locking fingers projecting from said first and second cam members so that said first and second detent members are respectively trapped between said locking fingers and said cam members when said output arm is translating back toward said input arm.

4. The mechanism according to claim 1, wherein said reference frame comprises first and second plate members each plate having one pair of carrier slots therein, and wherein said input arm and said output arm are mounted to said reference frame between said first and second plates.

5. The mechanism according to claim 4, wherein said storage spring is a coil spring having an axis along said longitudinal dimension and said coil spring being disposed between lateral projections of said input arm and said output arm.

6. A linear motion snap-action mechanism comprising, in combination:

a reference frame having a given longitudinal dimension, and said frame having at least one pair of carrier slots therein, with each carrier slot being provided along a generally lateral dimension;

first and second detent members respectively disposed and moveably mounted in said carrier slots;

spring bias means for urging said first and second detent members respectively toward one end of the corresponding carrier slot;

an input arm slidably mounted about said frame for translation in said given longitudinal dimension, said input arm having first and second cam members, said cam members being spaced from one another along said given longitudinal dimension, and each cam member being adapted to engage and move one of said first and second detent members away from said one end of said corresponding carrier slot as said input arm is translated into a corresponding position;

an output arm slidably mounted about said frame for translation in said given longitudinal dimension, said output arm having first and second detent slots, said detent slots being spaced from one another along said given longitudinal dimension, said first detent slot receiving said first detent member when said output arm is at a first position and said first detent member is urged toward said one end of said corresponding carrier slot, and said second detent slot receiving said second detent member when said output arm is at a second position and said second detent member is urged toward said one end of the other carrier slot;

a storage spring disposed between said input and output arms wherein said storage spring is compressed when said input arm is translated away from said output arm and wherein said output arm is translated back toward said input arm by the energy stored in said storage spring when either one of said cam members engages and moves said one of said first and second detent members; and wherein:

said reference frame comprises first and second plate members each plate having one pair of carrier slots therein and wherein said input arm and said output arm are mounted to said reference frame between said first and second plates;

wherein said storage spring is a coil spring having an axis along said longitudinal dimension and said coil spring being disposed between lateral projections of said input arm and said output arm; and, wherein said first and second plates each include a guide slot along said given longitudinal dimension, and wherein said input arm includes bearing means disposed in one of said guide slots to constrain the movement of said input arm in a path solely along said longitudinal dimension and wherein said output arm includes bearing means disposed in one of said guide slots to constrain the movement of said output arm in a path solely along said longitudinal dimension.

* * * * *